US010612189B2

(12) United States Patent
Wagner et al.

(10) Patent No.: US 10,612,189 B2
(45) Date of Patent: *Apr. 7, 2020

(54) COMPOSITE FABRICS COMBINING HIGH AND LOW STRENGTH MATERIALS

(71) Applicant: HONEYWELL INTERNATIONAL INC., Morris Plains, NJ (US)

(72) Inventors: Lori L. Wagner, Richmond, VA (US); Dalia Taylor, Midlothian, VA (US); David A. Hurst, Richmond, VA (US); Gregory A. Davis, Midlothian, VA (US); Sameer Agrawal, Moseley, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/081,428

(22) Filed: Mar. 25, 2016

(65) Prior Publication Data

US 2016/0312399 A1 Oct. 27, 2016

Related U.S. Application Data

(60) Provisional application No. 62/152,396, filed on Apr. 24, 2015.

(51) Int. Cl.
*D06M 17/10* (2006.01)
*B32B 7/12* (2006.01)
(Continued)

(52) U.S. Cl.
CPC ......... *D06M 17/10* (2013.01); *A41D 13/0012* (2013.01); *A41D 13/0055* (2013.01);
(Continued)

(58) Field of Classification Search
CPC ...... B32B 2260/023; B32B 2307/5825; B32B 2571/02; B32B 7/02; B32B 2250/20;
(Continued)

(56) References Cited

U.S. PATENT DOCUMENTS 4,681,792 A * 7/1987 Harpell ..................... B32B 7/00
428/102
4,748,064 A 5/1988 Harpell et al.
(Continued)

FOREIGN PATENT DOCUMENTS

KR 101231616 2/2013
WO 2008083457 7/2008
(Continued)

OTHER PUBLICATIONS

Brian Wang, "Understanding Strength of Materials and History of Improvement", Jan. 22, 2009, NextBigFuture.com, https://www.nextbigfuture.com/2009/01/understanding-strength-of-materials-and.html (Year: 2009).*
(Continued)

*Primary Examiner* — Scott R. Walshon
*Assistant Examiner* — Jasper Saberi
(74) *Attorney, Agent, or Firm* — Roberts & Roberts, LLP; Richard S. Roberts, Jr.

(57) ABSTRACT

Composite materials combining both high and low strength fibrous materials. More particularly, composite materials that are useful as lightweight vest covers for tactical vests and that are suitable for the formation of alternatives to conventional Modular Lightweight Load-carrying Equipment (MOLLE).

3 Claims, 2 Drawing Sheets

(51) Int. Cl.
| | |
|---|---|
| B32B 27/12 | (2006.01) |
| B32B 5/02 | (2006.01) |
| B32B 5/12 | (2006.01) |
| B32B 5/26 | (2006.01) |
| F41H 5/04 | (2006.01) |
| A41D 13/00 | (2006.01) |
| A41D 13/005 | (2006.01) |
| D06M 101/34 | (2006.01) |
| D06M 101/20 | (2006.01) |

(52) U.S. Cl.
CPC .............. *B32B 5/022* (2013.01); *B32B 5/024* (2013.01); *B32B 5/12* (2013.01); *B32B 5/26* (2013.01); *B32B 7/12* (2013.01); *B32B 27/12* (2013.01); *F41H 5/0471* (2013.01); *F41H 5/0478* (2013.01); *F41H 5/0485* (2013.01); *B32B 2250/20* (2013.01); *B32B 2255/02* (2013.01); *B32B 2255/26* (2013.01); *B32B 2260/021* (2013.01); *B32B 2260/046* (2013.01); *B32B 2262/0253* (2013.01); *B32B 2262/0261* (2013.01); *B32B 2307/54* (2013.01); *B32B 2307/584* (2013.01); *B32B 2307/5825* (2013.01); *B32B 2307/718* (2013.01); *B32B 2307/7265* (2013.01); *B32B 2307/734* (2013.01); *B32B 2437/00* (2013.01); *B32B 2571/02* (2013.01); *D06M 2101/20* (2013.01); *D06M 2101/34* (2013.01)

(58) Field of Classification Search
CPC .. B32B 5/26; A41D 31/0061; A41D 13/0012; A41D 13/0016; A41D 13/0055; A41D 13/0061; D06M 17/10; F41H 5/0485; F41H 5/0478; F41H 5/0471
See application file for complete search history.

(56) References Cited

U.S. PATENT DOCUMENTS

| | | | |
|---|---|---|---|
| 5,343,796 A * | 9/1994 | Cordova | B32B 5/26 89/36.02 |
| 5,354,605 A | 10/1994 | Lin et al. | |
| 5,466,503 A | 11/1995 | Dischler | |
| 5,789,327 A | 8/1998 | Rousseau | |
| 6,103,646 A | 8/2000 | Chiou | |
| 6,127,291 A | 10/2000 | Coppage, Jr. et al. | |
| 6,642,159 B1 | 11/2003 | Bhatnagar et al. | |
| 6,668,868 B2 | 12/2003 | Howland et al. | |
| 6,846,758 B2 | 1/2005 | Bhatnagar et al. | |
| 7,150,046 B2 | 12/2006 | Böttger et al. | |
| 7,407,900 B2 | 8/2008 | Cunningham | |
| 7,631,405 B2 | 12/2009 | Ritter et al. | |
| 7,700,503 B2 | 4/2010 | Thomas, Jr. | |
| 7,820,565 B2 | 10/2010 | Van Heerden | |
| 7,994,074 B1 | 8/2011 | Arvidson et al. | |
| 8,017,529 B1 | 9/2011 | Arvidson et al. | |
| 8,048,815 B2 | 11/2011 | Kubota et al. | |
| 8,298,969 B2 | 10/2012 | Bahukudumbi | |
| 8,883,661 B2 | 11/2014 | Montagna et al. | |
| 8,969,221 B2 | 3/2015 | Arvidson et al. | |
| 9,023,450 B2 | 5/2015 | Tam et al. | |
| 2005/0255776 A1* | 11/2005 | Howland | B32B 5/26 442/286 |
| 2010/0003452 A1* | 1/2010 | Jongedijk | B29C 43/003 428/107 |
| 2011/0129657 A1 | 6/2011 | Clough | |
| 2011/0154980 A1 | 6/2011 | Van Elburg | |
| 2011/0192530 A1* | 8/2011 | Arvidson | B32B 5/26 156/241 |
| 2011/0219943 A1 | 9/2011 | Arvidson et al. | |
| 2012/0174753 A1 | 7/2012 | Wagner et al. | |
| 2012/0174876 A1 | 7/2012 | Johnson | |
| 2012/0180184 A1* | 7/2012 | Crye | A41D 13/0007 2/69 |
| 2012/0186433 A1* | 7/2012 | Braiewa | B32B 5/18 89/36.02 |
| 2013/0115393 A1 | 5/2013 | Beck | |
| 2013/0143460 A1* | 6/2013 | Beck | D03D 1/0052 442/239 |
| 2014/0072758 A1* | 3/2014 | Arvidson | F41H 5/0485 428/114 |
| 2014/0113104 A1 | 4/2014 | Rozant et al. | |
| 2014/0206248 A1 | 7/2014 | Vito | |
| 2014/0272267 A1 | 9/2014 | Grunden et al. | |
| 2015/0034234 A1 | 2/2015 | Hanks et al. | |
| 2018/0022060 A1* | 1/2018 | Downs | B32B 5/08 89/36.02 |

FOREIGN PATENT DOCUMENTS

| | | |
|---|---|---|
| WO | 2012177227 | 12/2012 |
| WO | 2008105754 | 6/2013 |
| WO | 2015137833 | 9/2015 |
| WO | 2014148809 | 1/2016 |
| WO | 2016089715 | 6/2016 |

OTHER PUBLICATIONS

Lin et al., "Elucidating the Design and Impact Properties of Composite Nonwoven Fabrics with Various Filaments in Bulletproof Vest Cushion Layer," Textile Research Journal, SAGE Publications Inc., Taiwan, vol. 79, No. 3, pp. 268-274 (2009).

Lou et al., "Processing Technique and Property Evaluation of Stab-Resistant Composite Fabrics," Advanced Materials Research, Trans Tech Publications, Taiwan, vols. 239-242, pp. 683-686 (2011).

Sharma et al., "Effect of Compliant Thermoplastic Interlayers on High Velocity Impact Performance of Composite Laminates," International SAMPE Technical Conference, 2011 SAMPE Spring Technical Conference and Exhibition—State of the Industry: Advanced Materials, Applications, and Processing Technology, Soc. for the Advancement of Material and Process Engineering, pp. 1-13 (2011).

Jabbar et al., "Comparison of Mechanical and Ballistic Performance of Composite Laminates Produced from Single-Layer and Double-Layer Interlocked Woven Structures," Polymer Composites, John Wiley and Sons Inc., vol. 35, No. 8, pp. 1583-1591 (Aug. 2014).

Afshari et al., "Relationship Between Tensile Properties and Ballistic Performance of Poly(Ethylene Naphthalate) Woven and Nonwoven Fabrics," Journal of Applied Polymer Science, John Wiley and Sons Inc., vol. 125, No. 3, pp. 2271-2280 (Aug. 5, 2012).

Segal, Charles L., "High-Performance Organic Fibers, Fabrics, and Composites for Soft and Hard Armor Applications," International SAMPE Technical Conference, SAMPE, vol. 23, pp. 651-660 (1991).

Faur-Csukat, Gabriella, "A Study on the Ballistic Performance of Composites," Macromolecular Symposia, Wiley-VCH Verlag, vol. 239, pp. 217-226 (2006).

Nashed et al., "Projectile Impact Behavior of Z-fiber Reinforced Laminar Composites," Advanced Materials Research, Trans Tech Publications, vol. 441, pp. 717-725 (2012).

Ramkumar, et al., "Body Armour Composite Fabrics: An Overview," International Textile Bulletin: Nonwovens, Industrial Textiles, Verlag Textilveredlung AG, vol. 48, No. 2, pp. 16-22 (Jun. 2002).

Bilisik, Kadir, "Experimental Determination of Ballistic Performance of Newly Developed Multiaxis Non-Interlaced/Non-Z E-Glass/Polyester and 3D Woven Carbon/Epoxy Composites with Soft Backing Aramid Fabric Structures," Textile Research Journal, SAGE Publications Ltd., vol. 81, No. 5, pp. 520-537 (Mar. 2011).

Boussu, Francois, "The Use of Warp Interlock Fabric Inside Textile Composite Protection Against Ballistic Impact," Textile Research Journal, SAGE Publications Ltd., vol. 81, No. 4, pp. 344-354 (Mar. 2011).

Chen et al., "Numerical and Experimental Investigations into Ballistic Performance of Hybrid Fabric Panels," Composites Part B: Engineering, Elsevier Ltd., vol. 58, pp. 35-42 (2014).

(56) References Cited

OTHER PUBLICATIONS

Cordova et al., "Hybrid Fiber Reinforced Composites—Advantages Over Traditional Single Fiber Systems," Annual Technical Conference—Society of Plastics Engineers, Soc of Plastics Engineers, pp. 767-772 (1987).
Naik et al., "Ballistic Impact Behaviour of Woven Fabric Composites: Formulation," International Journal of Impact Engineering, Elsevier Ltd., vol. 32, No. 9, pp. 1521-1552 (Sep. 2006).
Lin et al., "Process and ballistic-resistant buffer effect of cushion composite layer made of three-dimensional crimped hollow fiber," Journal of Reinforced Plastics and Composites, SAGE Publications Ltd., vol. 29, No. 11, pp. 1681-1687 (Jun. 2010).
Supplementary European Search Report for EP16818376.

\* cited by examiner

FIG. 1

(PRIOR ART)

FIG. 2

COMPOSITE FABRICS COMBINING HIGH AND LOW STRENGTH MATERIALS

CROSS-REFERENCE TO RELATED APPLICATION

This application claims the benefit of U.S. Provisional Application Ser. No. 62/152,396, filed on Apr. 24, 2015, the disclosure of which is incorporated by reference herein in its entirety.

BACKGROUND

Technical Field

The disclosure relates to composite materials combining both high and low strength fibrous materials. More particularly, the disclosure pertains to composite materials that are useful as lightweight vest covers for tactical vests and that are suitable for the formation of alternatives to conventional Modular Lightweight Load-carrying Equipment (MOLLE).

Description of the Related Art

Body armor products, such as bullet resistant vests, are typically provided with a cover that contains compartments or pockets into which panels of ballistic resistant materials are positioned. Soft body armor covers include woven fabrics, for example, those made from ballistic nylon, cotton and/or other fiber types. One example of a known bullet resistant vest including a vest cover is disclosed in U.S. Pat. No. 5,398,340, which provides a vest that remains in a proper protective position when worn by a moving officer.

Current outer vest covers for tactical vests are typically fabricated with abrasion resistant woven nylon fabrics, such as conventionally known CORDURA® brand nylon fabrics commercially available from Invista North America S.A R.L. of Wilmington, Del., and a Pouch Attachment Ladder System (PALS) webbing design. In a conventional PALS webbing design, rows of the heavy-duty nylon are precisely stitched onto the vest or vest cover to form a grid of attachment points to which accessories and pouches for holding accessories may be attached. Load-bearing equipment and gear incorporating the PALS webbing design are known as Modular Lightweight Load-carrying Equipment, or MOLLE, with MOLLE-compatible pouches and accessories being widely commercially available.

Figure 1:
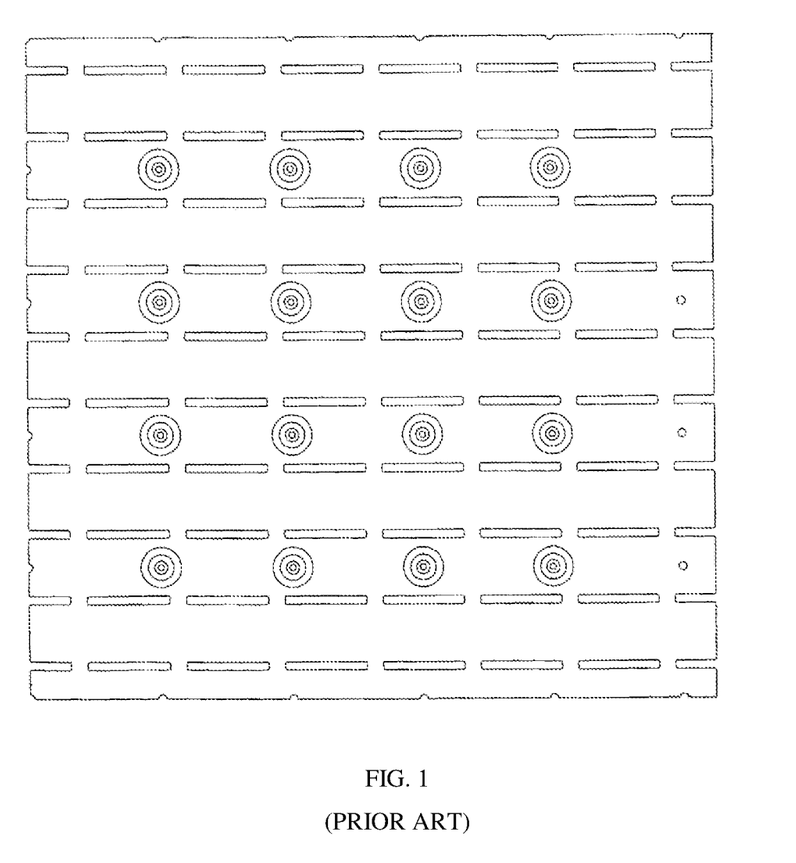
FIG. 1 is a perspective view schematic representation of the prior art FAV™ Advanced Webless System as described and illustrated in U.S. Pat. No. 7,200,871.

Although useful, the PALS/MOLLE construction adds significant weight to a vest and the three-dimensional PALS grid does not provide streamlined mobility. Accordingly, alternatives to the conventional MOLLE construction are desirable. One alternative is known as the FAV™ Advanced Webless System (AWS) commercially available from Safariland LLC of Jacksonville, Fla. This AWS, which is illustrated in FIG. 1, replaces the conventional PALS nylon webbing grid that is sewn on the a vest cover with a fabric incorporating a pattern of holes or slots that is cut into and completely through the fabric of the vest cover, thereby providing attachment points within the vest cover itself. See, for example, U.S. Pat. No. 7,200,871, which describes the AWS as a fabric sheet having an array of slots extending through the fabric sheet to accommodate straps for MOLLE attachments. While this AWS structure offers similar functionality to the conventional three-dimensional PALS grid, it has been recognized that the slots are not as durable as the attachment points in the PALS grid and after repeated use the fabric at the lower periphery of the slots tends to stretch and sag. This sagging reduces the integrity of the slot, making it difficult to tightly secure modular attachments to the vest, and may ultimately lead to complete tearing of the slot. Accordingly, a solution to this problem is desired that is capable of being employed for the formation of such a webless attachment system having greater fabric strength and long term durability after repeated use, and without losing the desirable abrasion resistance of the conventional nylon fabric. The invention provides a solution to that need.

SUMMARY OF THE DISCLOSURE

This disclosure provides composite materials combining both high and low strength fibrous materials that are useful as vest covers for tactical vests, and which are particularly suitable for the formation of webless modular attachment system, while also suitable for use in traditional PALS/MOLLE systems. Particularly, the disclosure provides hybrid composite structures that combine a low tenacity, abrasion resistant fabric with a higher tenacity material in a unitary consolidated construction that has improved strength and dimensional stability to effectively replace or replicate the functionality of PALS/MOLLE attachment points.

More particularly, provided is a composite comprising:

a first fibrous material layer comprising one or more fibrous plies, said first fibrous material comprising fibers having a tenacity of 10 g/denier or less; and a second fibrous material layer bonded to the first fibrous material layer, said second fibrous material layer comprising one or more fibrous plies, said second fibrous material comprising fibers having a tenacity of greater than 10 g/denier;

wherein the first fibrous material layer and the second fibrous material layer are bonded together with an adhesive that penetrates into the first fibrous material layer without fully permeating the first fibrous material layer, and wherein the second fibrous material has an areal density of less than 100 g/m$^2$.

Also provided is a composite comprising:

a first fibrous material layer comprising one or more fibrous plies, each of said plies comprising nylon fibers; and a second fibrous material layer bonded to the first fibrous material layer, said second fibrous material layer comprising one or more non-woven fibrous plies.

Still further provided is a method of forming a composite comprising:

a) providing a first fibrous material layer comprising one or more fibrous plies, each of said plies comprising nylon fibers;

b) providing a second fibrous material layer comprising one or more fibrous plies said second fibrous material layer comprising one or more non-woven fibrous plies; and c) bonding the first fibrous material layer to the second fibrous material layer with an adhesive and under pressure wherein the adhesive does not fully permeate the first fibrous material layer.

Also provided is a composite comprising:

a first material layer comprising one or more fibrous plies, said first material layer comprising fibers having a tenacity of 10 g/denier or less; and a second material layer bonded to the first material layer, said second material layer comprising one or more plies, each of said plies comprising a plurality of non-fibrous tapes;

wherein the first material layer and the second material layer are bonded together with an adhesive.

DETAILED DESCRIPTION

The composites provided herein include two or more different fibrous material layer sections, each section comprising one or more fibrous plies. Each of the fibrous plies of each fibrous material layer comprises one or more fibers, most preferably a plurality of fibers, and optionally a polymeric binder material on the fibers. Most broadly, a first fibrous material layer having first and second surfaces and a second fibrous material layer having first and second surfaces are bonded together such that the second surface of the first fibrous material layer is adhesively bonded to the first surface of the second fibrous material layer. In another embodiment, a third fibrous material layer having first and second surfaces is attached to the second fibrous material layer, with the second surface of the second fibrous material layer being attached to the first surface of the third fibrous material layer.

In each embodiment of the disclosure, the first fibrous material is preferably fabricated with low tensile strength fibers, while each of the second fibrous material and optional third fibrous material are fabricated with high tensile strength fibers. As used herein, a "fiber" is a long strand of a material, such as a strand of a polymeric material, the length dimension of which is much greater than the transverse dimensions of width and thickness. The fiber is preferably a long, continuous strand rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." The term "tenacity" refers to the tensile stress expressed as force (grams) per unit linear density (denier) of an unstressed specimen. The term "initial tensile modulus" refers to the ratio of the change in tenacity, expressed in grams-force per denier (g/d) to the change in strain, expressed as a fraction of the original fiber/tape length (in/in).

The term "denier" is a unit of linear density equal to the mass in grams per 9000 meters of fiber/yarn. In this regard, the fibers forming each layer may be of any suitable denier. For example, fibers may have a denier of from about 50 to about 5000 denier, more preferably from about 200 to 5000 denier, still more preferably from about 300 to about 3000 denier, and most preferably from about 350 to about 1000 denier.

A fibrous material "layer" as used herein may comprise any type of uni-axial or multi-axial fabric, including a single-ply of unidirectionally oriented or randomly oriented (i.e. felted) non-woven fibers, a plurality of plies of non-woven fibers that have been consolidated into a single unitary structure, a single-ply of woven fabric, a plurality of woven fabric plies that have been consolidated into a single unitary structure, a single-ply of knitted fabric or a plurality of knitted fabric plies that have been consolidated into a single unitary structure. In this regard, a "layer" describes a generally planar arrangement having an outer top (first) planar surface and an outer bottom (second) planar surface. The term "fibrous ply" as used herein refers to a single array of unidirectionally oriented fibers, a single woven fabric, a single knitted fabric or a single felted fabric. Each fibrous ply will also have both an outer top surface and an outer bottom surface and a plurality of "fibrous plies" describes more than one ply of the fibrous structures. A "single-ply" of unidirectionally oriented fibers comprises an arrangement of fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven and knitted fabrics, and a "parallel array" describes an orderly, side-by-side, coplanar parallel arrangement of fibers or yarns. The term "oriented" as used in the context of "oriented fibers" refers to the alignment direction of the fibers rather than to stretching of the fibers. The term "fabric" describes structures that may include one or more fiber plies, with or without consolidation/molding of the plies. A non-woven fabric formed from unidirectional fibers typically comprises a plurality of non-woven fiber plies that are stacked on each other surface-to-surface in a substantially coextensive fashion and consolidated. When used herein, a "single-layer" structure refers to any monolithic fibrous structure composed of one or more individual plies, wherein multiple plies have been merged by consolidation or molding techniques. The term "composite" refers to combinations of fibers, optionally but preferably with a polymeric binder material.

As used herein, a "high tensile strength" fiber is one which has a tenacity of at least 10 g/denier, an initial tensile modulus of at least about 150 g/denier or more, and an energy-to-break of at least about 8 J/g or more, each as measured by ASTM D2256. As used herein, a "low tensile strength fiber" is one which has a tenacity of less than 10 g/denier. The first fibrous material is formed from fibers having a lower tensile strength than the fibers forming the second fibrous material. In preferred embodiments, each of the fibers forming each of the fibrous plies of the first fibrous material are preferably fibers having a tenacity of less than 10 g/denier, more preferably from about 5 g/denier to about 10 g/denier, and most preferably have a tenacity of less than 7 g/denier, less than 6 g/denier or less than 5 g/denier. Higher or lower tenacity fibers are also useful in forming the first fibrous material provided that their tenacities are lower than the fibers forming the second fibrous material.

Suitable low tenacity fibers for forming the first fibrous material within these tenacity ranges non-exclusively include nylon fibers, polyester fibers, polypropylene fibers, low tenacity polyolefin fibers, or a combination thereof. Of these fiber types, nylon fibers are most preferred. Fabrics formed from such fibers are widely commercially available. Particularly suitable are CORDURA® brand nylon fabrics as mentioned above which are commercially available from Invista North America S.A R.L. of Wilmington, Del. Nylon fabrics, such as the CORDURA® brand fabrics, are available in a range of deniers and weights, ranging from low denier ripstop fabrics (approximately 30-100 denier) to high denier ballistic fabrics (approximately 400-1500 denier). Particularly preferred fibers for the first fibrous material are nylon fibers having a denier of from 400 to 2000 denier, more preferably from about 500 to about 1500 denier, and most preferably from about 500 to about 1000 denier.

Most preferably, the first fibrous material comprises a single ply of a woven nylon fabric formed from nylon fibers having a denier of from about 500 to 1000 denier, with a weave density of at least 26 fiber/yarn ends per inch×26 fiber/yarn ends per inch. Although such woven fabrics are formed from mechanically interlocked fibers, such commercially available woven nylon fabrics are typically coated with a water repellent polyurethane resin on at least one its surfaces. In this regard, in a vest or vest cover application, there are specific requirements for nylon fabrics that must be met and which are regulated by military standard MIL-DTL-32439, having particular requirements for properties including yarn denier, fabric weave density and fabric areal density depending on the intended type of armor application. Accordingly, while the properties of the first fibrous material may vary depending on the application, it is most preferred that the first fibrous material is compliant with the MIL-DTL-32439 specifications, which would be readily accomplished by one skilled in the art.

The second fibrous material comprises high tensile strength fibers that preferably have a significantly higher tenacity than the fibers forming the first fibrous material. In this regard, most or all of the fibers forming the second fibrous material have a substantially greater tenacity than most or all of the fibers forming the first fibrous material. By "most or all" it is meant that more than 50% of the fibers forming the second fibrous material have a tenacity that is greater than the tenacity of at least 50% of the fibers forming the first fibrous material. Most preferably, all of the fibers of the second fibrous material are fibers having a tenacity greater than all of the fibers of the first fibrous material. In this regard, the fibers forming each of the first fibrous material and the second fibrous material are exclusive of any fibers or threads that may be employed to stitch or sew together any of the fibrous plies or sections.

The optional third fibrous material may comprise either low tensile strength fibers or high tensile strength fibers, but preferably comprises high tensile strength fibers. Most preferably, all of the fibers of the third fibrous material are fibers having a tenacity greater than all of the fibers of the first fibrous material. Such fibers of the third fibrous material may be the same as or different than the fibers forming the second fibrous material. Accordingly, the both the second fibrous material and the optional third fibrous material individually have significantly greater ballistic penetration resistance than the first fibrous material individually, and as stated above, the fibers forming each of the first fibrous material, second fibrous material and third fibrous material are exclusive of fibers or threads employed to stitch or sew together a plurality of fibrous plies or fibrous sections.

Each of the fibers forming each of the fibrous plies of the second fibrous material and the optional third fibrous material are preferably fibers having a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier.

The type of fibers forming the fibrous plies of the each of the second fibrous material, optional third fibrous material and any additional optional fibrous materials that may be attached to the third fibrous material layer may vary depending on the desired tensile properties for each material. Particularly suitable high tenacity fibers include polyolefin fibers, such as high molecular weight polyethylene fibers, particularly ultra-high molecular weight polyethylene fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred fiber types for the second fibrous material and optional third fibrous material are high performance fibers including polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are polyethylene fibers and aramid fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244;

5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the polyethylene fibers sold under the trademark SPECTRA® from Honeywell International Inc. SPECTRA® fibers are well known in the art. Other useful polyethylene fiber types also include and DYNEEMA® UHMW PE yarns commercially available from Royal DSM N.V. Corporation of Heerlen, The Netherlands.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" processes, also referred to as "solution spinning," wherein a solution of ultra high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl (2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPeffex™ E-Glass fibers, commercially available from 3B Fibreglass of Battice, Belgium, and VETROTEX® R-glass fibers from Saint-Gobain of Courbevoie, France.

As stated previously, the fibers may be of any suitable denier. Preferred fiber deniers for the low tenacity fibers of the first fibrous material are stated above, with 500 denier and 1000 denier nylon fibers being most preferred for forming the first fibrous material. Preferred fiber deniers for the high tenacity fibers of the second and optional third fibrous materials may be from about 50 to about 5000 denier, more preferably from about 200 to 5000 denier, still more preferably from about 300 to about 3000 denier, and most preferably from about 350 to about 1000 denier, with 375 denier and 400 denier polyethylene fibers or aramid fibers being most preferred for each of the second fibrous material and third fibrous material.

As previously stated, each of the fibrous materials, including the first, second and third fibrous materials, and any optional additional fibrous layers, may individually comprise any type of uni-axial or multi-axial fabric, including woven fabrics, non-woven fabrics formed from unidirectionally oriented fibers, non-woven felted fabrics formed from randomly oriented fibers, or knitted fabrics. Woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers are woven together in an orthogonal 0°/90° orientation with warp fibers oriented perpendicular to weft (fill) fibers, and is preferred. The warp and weft (fill) count, known in the art as a "pick count" or "mesh count," is a measure of the density of the woven fabric. Plain weave fabrics may have an equal or unequal warp and weft count. In this regard, preferred first fibrous materials have a preferred pick count of from about 20 ends per inch to about 80 ends per inch in each of the warp and weft directions, more preferably from about 25 ends per inch to about 70 ends per inch in each of the warp and weft directions, and most preferably from about 25 ends per inch to about 60 ends per inch in each of the warp and weft directions. Preferred second fibrous materials have a preferred pick count of from about 15 ends per inch to about 70 ends per inch in each of the warp and weft directions, more preferably from about 20 ends per inch to about 60 ends per inch in each of the warp and weft directions, still more preferably from about 20 ends per inch to about 50 ends per inch in each of the warp and weft directions, and most preferably from about 25 ends per inch to about 40 ends per inch in each of the warp and weft directions.

Knit fabric structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

A non-woven unidirectional fibrous ply of the invention may be formed by conventional methods in the art. For example, in a preferred method of forming a non-woven unidirectional fibrous ply, a plurality of fibers are arranged into an array, typically being arranged as a fiber web comprising a plurality of fibers aligned in a substantially parallel, unidirectional array. In a typical process, fiber bundles are supplied from a creel and led through guides and one or more spreader bars into a collimating comb. This is typically followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other.

Felts may also be formed by one of several techniques known in the art, such as by carding or fluid laying, melt blowing and spin laying. A felt is a non-woven network of randomly oriented fibers, preferably at least one of which is a discontinuous fiber, preferably a staple fiber having a length ranging from about 0.25 inch (0.64 cm) to about 10 inches (25.4 cm).

The second fibrous material and the optional third fibrous material may each may be the same or different in fabric structure relative to each other. Preferably, the composite articles are formed by a combination of different types of fabrics forming a hybrid structure. In one preferred embodiment, the second fibrous material comprises a plurality of unidirectional non-woven fibrous plies, and a third fibrous material is included and comprises a plurality of woven fibrous plies. In another embodiment, all of the fibrous plies of both the second fibrous material and the third fibrous material are non-woven. In yet another preferred embodiment, all of the fibrous plies of the second fibrous material are woven plies and all of the fibrous plies of the third fibrous material are unidirectional non-woven plies. However, in every embodiment, it is most preferred that the outermost first fibrous material is comprises one or more woven fibrous plies.

In yet another particularly preferred embodiment, the second fibrous material and/or the optional third fibrous material is a woven fabric wherein the component fibers are in the form of fibrous tapes as described in, for example, commonly-owned U.S. Pat. Nos. 8,263,119; 8,697,220; 8,685,519; 8,852,714; 8,906,485, each of which is incorporated herein by reference to the extent consistent herewith; as well as the fibrous and non-fibrous tapes described in commonly-owned U.S. pre-grant publications 2013-0101787 and 2014-0260933, each of which is incorporated herein by reference to the extent consistent herewith. In this regard, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. A tape may be a fibrous material or a non-fibrous material, wherein a fibrous material comprises one or more filaments. A non-fibrous tape material may be formed, for example, from strips of polymer formed by slicing a polymer film. Like fibers, the tapes may be of any suitable denier, preferably having a denier of from about 50 to about 30,000, more preferably from about 200 to 10,000 denier, still more preferably from about 650 to about 2000 denier, and most preferably from about 800 to about 1500 denier.

Whether unidirectional non-woven, felted non-woven, woven or knitted, when a fibrous material layer comprises a plurality of fibrous plies, the plurality of fibrous plies may be merged together according to conventional methods in the art to form each individual section of the composite prior to merging all the individual sections together into a unitary composite article. In this regard, a plurality of single plies of the selected fabric/fibrous ply type are stacked on top of each other in coextensive fashion and merged, i.e. consolidated, together. When a section (e.g. the first fibrous material, or the second fibrous material, or the third fibrous material, etc.) comprises felted non-woven, woven or knitted fibrous plies, each section of fibrous material preferably includes from about 1 to about 100 fibrous plies, more preferably from about 2 to about 85 fibrous plies, and most preferably from about 2 to about 65 fibrous plies. When a section comprises a plurality of unidirectional non-woven fibrous plies, it is typical for a plurality of such plies to first be formed into a 2-ply or 4-ply unidirectional non-woven fiber "layer," also referred to in the art as a "pre-preg," prior to combining a plurality of such "layers" or "pre-pregs" together to form the section. Each "layer" or "pre-preg" typically includes from 2 to about 6 fibrous plies, typically being cross-plied at 0°/90°, but may include as many as about 10 to about 20 fibrous plies as may be desired for various applications, with the layers also being cross-plied at alternating 0°/90° orientations. When a section (e.g. the first fibrous material, or the second fibrous material, or the third fibrous material, etc.) comprises such non-woven unidirectional fiber "layers," the section preferably comprises from 2 to about 100 fiber layers, more preferably from about 2 to about 85 fiber layers, and most preferably from about 2 to about 65 fiber layers. The total number of fibrous plies in each of the first fibrous material, second fibrous material, optional third fibrous material and any additional fibrous materials may be different or may be the same, wherein the layers are of any suitable thickness. Additionally, the individual plies of each individual section may also remain unconsolidated prior to a single consolidation or molding step to combine multiple unconsolidated composite sections together in a single step.

With particular regard to fibrous materials comprising a plurality of unidirectional non-woven fibrous plies, it is conventionally known in the art to coextensively stack individual fibrous plies upon each other such that the unidirectionally oriented fibers in each fibrous ply are oriented in a non-parallel longitudinal fiber direction relative to the longitudinal fiber direction of each adjacent ply. Most typically, the fibrous plies are cross-plied orthogonally at 0° and 90° angles wherein the angle of the fibers in even numbered layers is preferably substantially the same and the angle of the fibers in odd numbered layers is preferably substantially the same, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623, 574; and 4,737,402, all of which are incorporated herein by reference to the extent not incompatible herewith. With particular regard to fibrous materials comprising one or more woven fibrous plies, it is also typical for the warp and weft component fibers forming a single fibrous material to be oriented orthogonally to each other.

The fibers forming each fibrous material of the disclosure are preferably, but not necessarily, at least partially coated with a polymeric binder material. The polymeric binder material is also commonly referred to in the art as a polymeric "matrix" material. These terms are conventionally known in the art and describe a material that binds fibers together, either by way of its inherent adhesive characteristics or after being subjected to well known heat and/or pressure conditions. As used herein, a "polymeric" binder or matrix material includes resins and rubber. When present, the polymeric binder/matrix material either partially or substantially coats the individual fibers, preferably substantially coating each of the individual filaments/fibers forming a fiber ply or fiber layer, or fully encapsulating each of the individual filaments/fibers forming a fiber ply or fiber layer.

Suitable polymeric binder materials include both low tensile modulus, elastomeric materials and high tensile modulus materials. As used herein throughout, the term tensile modulus means the modulus of elasticity, which for polymeric binder materials is measured by ASTM D638. A low or high modulus binder may comprise a variety of polymeric and non-polymeric materials. For the purposes of this invention, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Düsseldorf, Germany. Conventional low modulus polymeric binder polymers employed in ballistic resistant composites include polystyrene-polyisoprene-polystyrene block copolymers sold under the trademark KRATON® commercially produced by Kraton Polymers.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone, and possessing a high tensile modulus when cured of at least about $1\times10^6$ psi (6895 MPa) as measured by ASTM D638. Also useful are the binder materials described in U.S. Pat. No. 6,642,159, the disclosure of which is incorporated herein by reference. However, low modulus binder materials are preferred over high modulus binder materials.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

When a fibrous material of the disclosure does include a binder, the total weight of the binder comprising the particular fibrous material preferably comprises from about 2% to about 50% by weight, more preferably from about 5% to about 30%, more preferably from about 7% to about 20%, and most preferably from about 14% to about 20% by weight of the fibers plus the weight of the binder. A lower binder content is appropriate for woven and knitted fabrics, wherein a polymeric binder content of greater than zero but less than 10% by weight of the fibers plus the weight of the binder is typically most preferred, but this is not intended as strictly limiting. For example, phenolic/PVB impregnated woven aramid fabrics are sometimes fabricated with a higher resin content of from about 20% to about 30%, although about 12% content is typically preferred. In this regard, weaving or knitting of fabrics is typically performed prior to coating the fibers of a woven fabric with a polymeric binder, wherein the fabrics are thereafter impregnated with the binder.

Methods for applying a polymeric binder material to fibers to thereby impregnate fibrous materials (fibrous material plies/layers) with the binder are well known and readily determined by one skilled in the art. The term "impregnated" is considered herein as being synonymous with "embedded," "coated," or otherwise applied with a polymeric coating where the polymeric material diffuses into the fiber ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material.

In accordance with the disclosure, regardless of the method used to join the plies of each individual section to each other, all of the sections of the composite article (i.e. the first fibrous material layer, second fibrous material layer, optional third fibrous material layer, and any other additional optional fibrous material layers), are to be bonded together under pressure, i.e. by low pressure consolidation/lamination or by high pressure molding, with an intermediate adhesive or by employing an existing polymeric binder coating as an adhesive to aid in bonding the different sections together, wherein a consolidated, unitary composite article is formed. This specifically excludes stitching as a sole means of attaching the different sections together. It has been found that bonding the sections together by adhesive molding or adhesive consolidation will increase inter-laminar strength between the different sections, which translates to greater peel strength between the individual material layers, higher stiffness of the consolidated composite, and greater tear resistance of the consolidated composite.

It is most preferred that the pressurized merging of the layers is performed so that the adhesive used to bond the first fibrous material layer and second fibrous material layer together penetrates into the first fibrous material layer. In this regard, penetration of the adhesive into the first fibrous material layer means that the adhesive is both on and between the fibers forming at least the first fibrous ply of the first fibrous material layer, said first fibrous ply of the first fibrous material layer being the fibrous ply that is positioned closest to the surface of the second fibrous material layer. However, the adhesive should not fully permeate the first fibrous material layer. Full permeation of the adhesive through the first fibrous material layer is undesirable because it will affect the appearance of the outermost surface of the first fibrous material layer, and possibly fail to meet the requirements of military standard MIL-DTL-32439.

Such penetration without full permeation of the adhesive may be achieved, for example, by utilizing a non-woven fabric for the second fibrous material, preferably a non-woven fabric comprising a plurality of plies of unidirectionally oriented fibers, which plies are impregnated with a polymeric matrix. In this embodiment, if a separate adhesive is not added between the first and second fibrous material layers, the matrix of the second fibrous material layer will diffuse to a degree into the first fibrous material layer. If a separate adhesive is added between the first and second fibrous material layers, the presence of the matrix in the second fibrous material layer will block diffusion of the adhesive into the second fibrous material layer to a degree, forcing it partially into the first fibrous material layer.

In an alternate embodiment, penetration of an intermediate adhesive into the first fibrous material layer may be achieved when the second fibrous material layer comprises a woven fabric. In one of such embodiments, the woven fibrous plies are impregnated with a polymeric matrix which will function similarly to the matrix of a non-woven fabric, forcing the adhesive into the first fibrous material. In another embodiment where the second fibrous material is woven, the adhesive is forced into the first fibrous material layer by selecting woven fabrics wherein the weave density of the second fibrous material is greater than the weave density of the weave density of the first fibrous material. Particularly, it is preferred that the ratio of the weave density of the second fibrous material to the weave density of the first fibrous material layer is preferably at least 1.5:1, more preferably at least 2.0:1, still more preferably at least 2.5:1, and most preferably at least 3:1.

In an embodiment wherein the second fibrous material comprises a tape based woven material, such tape-based woven fibrous materials have less space between warp direction tapes and weft direction tapes, thereby reducing the space between warp tapes and between weft tapes in the woven fabric, and thereby blocking migration of the adhesive during consolidation or molding.

While it is most preferred that surfaces of the first fibrous material layer and the second fibrous material layer are directly adhesively bonded to each other using an existing polymeric matrix or other existing fiber coating as an adhesive, the layers may also be indirectly adhesively bonded to each other wherein a separate intermediate adhesive, including an adhesive film or an intermediate adhesive fabric (such as an adhesive web or adhesive scrim), or another type of intermediate adhesive material is used to bond the layers together. In this regard, suitable adhesives non-exclusively include elastomeric materials such as polyethylene, cross-linked polyethylene, chlorosulfonated polyethylene, ethylene copolymers, polypropylene, propylene copolymers, polybutadiene, polyisoprene, natural rubber, ethylene-propylene copolymers, ethylene-propylene-diene terpolymers, polysulfide polymers, polyurethane elastomers, polychloroprene, plasticized polyvinylchloride using one or more plasticizers that are well known in the art (such as dioctyl phthalate), butadiene acrylonitrile elastomers, poly(isobutylene-co-isoprene), polyacrylates, polyesters, unsaturated polyesters, polyethers, fluoroelastomers, silicone elastomers, copolymers of ethylene, thermoplastic elastomers, phenolics, polybutyrals, epoxy polymers, styrenic block copolymers, such as styrene-isoprene-styrene or styrenebutadiene-styrene types, and other suitable adhesive compositions conventionally known in the art. Other particularly preferred adhesives include methacrylate adhesives, cyanoacrylate adhesives, UV cure adhesives, urethane adhesives, epoxy adhesives and blends of the above materials. Of these, an adhesive comprising a polyurethane thermoplastic adhesive, particularly a blend of one or more polyurethane thermoplastics with one or more other thermoplastic polymers, is preferred. The most preferred polyurethane adhesive comprises a polyether aliphatic polyurethane. Such adhesives may be applied, for example, in the form of a hot melt, film, paste or spray, or as a two-component liquid adhesive. Also suitable are porous films formed from these or other adhesive polymers, as well as strips of such adhesive polymers or discontinuous melted powders of such adhesive polymers.

Suitable adhesive webs or adhesive scrims non-exclusively include discontinuous thermoplastic webs, ordered discontinuous thermoplastic nets, non-woven discontinuous adhesive fabrics and non-woven discontinuous adhesive scrims. Most preferred adhesive webs/scrims are heat-activated, non-woven adhesive webs such as SPUNFAB®, commercially available from Spunfab, Ltd, of Cuyahoga Falls, Ohio (trademark registered to Keuchel Associates, Inc.). Also suitable are THERMOPLAST™ and HELIOPLAST™ webs, nets and films, commercially available from Protechnic S.A. of Cernay, France. Of all the above, most preferred is a polyamide web, particularly SPUNFAB® polyamide webs. SPUNFAB® polyamide webs have a melting point of typically from about 75° C. to about 200° C., but this is not limiting.

When forming the individual material layer sections, and also when forming a consolidated composite article of the disclosure that combines all of the fibrous material layers into a single unitary composite article, all the plies and/or material layers are overlapped on top of each other to form a stack followed by consolidating the plurality of plies and/or plurality of layers together at once. Merging of the plies/layers into single-layer composite structures may be accomplished using conventional techniques in the art, which as noted above includes both low pressure consolidation techniques and high pressure molding techniques, with or without heat.

In the preferred embodiments, each stack of overlapping non-woven fiber plies (unidirectional or felted), woven fabric plies, knitted fabric plies or a combination thereof is merged under heat and pressure, or by adhering the coatings of individual fibrous plies to each other, to thereby form a single-layer, monolithic element. Methods of consolidating fibrous plies/layers are well known, such as by the methods described in U.S. Pat. No. 6,642,159. Although consolidation can occur without pressure via drying, cooling, heating or a combination thereof, pressurized consolidation is preferred for optimum bonding of the layers. In this regard, consolidation may be performed at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that a present polymeric binder coating can be caused to stick or flow without completely melting. Generally, if the polymeric binder material is caused to melt, relatively little pressure is required to form the composite, while if the binder material is only heated to a sticking point more pressure is typically required. As is conventionally known in the art, consolidation may be conducted in a calender set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat-bed laminator to improve the uniformity and strength of the bond.

High pressure merging of the fibrous plies may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fibrous plies are molded has a direct effect on the stiffness or flexibility of the resulting molded product. Particularly, the higher the pressure at which they are molded, the higher the stiffness, and vice-versa. In addition to the molding pressure, the quantity, thickness and composition of the fibrous plies and polymeric binder coating type also directly affects the stiffness of composite.

While each of the molding and consolidation techniques described herein are similar and the terms are often used interchangeably in the art, "molding" as used herein specifically refers to a method of merging by bonding fibrous plies/layers together in a batch process, while "consolidation" refers to a method of merging by bonding fibrous plies/layers together in a generally continuous process. Further, molding typically involves the use of a mold, such as a shaped mold or a match-die mold when forming a flat panel, and does not necessarily result in a planar product. Normally consolidation is done in a flat-bed laminator, in a double belt or steel belt press, in a calendar nip set or by wet lamination to produce soft (flexible) body armor fabrics. In addition, molding is typically performed under relatively high pressure, while consolidation is typically performed under relatively low pressure, as discussed above. However, this is not intended to be strictly limiting and molding procedures, such as vacuum molding or autoclave molding, are often performed at relatively low pressures as determined by one skilled in the art. In either process, suitable temperatures, pressures and times are generally dependent on the type of polymeric binder coating materials, polymeric binder content, process used and fiber type.

While adhesive bonding methods are used to form the multi-section composites, alternative non-adhesive attachment methods are also applicable to merge a plurality of woven fabrics, knitted fabrics or felted non-woven fabrics to form the individual layer sections, i.e. to merge the individual fibrous material plies into unitary sections (layers) prior to merging of the plurality of sections (layers) into a single, multi-section (multilayer) unitary composite. For example, a plurality of woven fabrics may be interconnected with each other using 3D weaving methods, such as by weaving warp and weft threads into a stack of woven fabrics both horizontally and vertically. A plurality of woven fabrics may also be attached to each other by mechanical attachment such as stitching/needle punching fabrics together in the z-direction. Similar techniques may be employed for merging a plurality of knitted fabrics. Felted fibrous plies may be consolidated mechanically such as by needle punching, stitch-bonding, hydro-entanglement, air entanglement, spin bonding, spin lacing or the like, chemically such as with an adhesive, or thermally with a fiber to point bond or a blended fiber with a lower melting point. The preferred felt consolidation method is needle punching alone or followed by one of the other methods. The preferred felt is a needle punched felt.

Upon consolidation of the first material layer and the second material layer, with or without the optional third material layer, a composite achieved having a slit tear resistance of greater than about 300 lbs, preferably greater than about 400 lbs, more preferably at least about 500 lbs. or more, and most preferably at least about 600 lbs or more as determined by the MIL-C-21189 slit tear testing method. Particularly, the slit tear strength of the consolidated composite of the disclosure is greater than the slit tear strength of the nylon fabric alone. The consolidated composite also exhibits peel strength between the first fibrous material layer and the second fibrous material layer of at least 2 lbs/inch.

Either before or after consolidation/molding of the fibrous plies to form the individual fibrous material sections, or before or after consolidation/molding of the fibrous material layers to form the composite article of the disclosure, a polymeric film may be attached to one or more of the surfaces of any of the fibrous material layers. In these embodiments, particularly preferred polymer films non-exclusively include thermoplastic polymer layers including polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Such thermoplastic polymer layers are preferably very thin, having preferred layer thicknesses of from about 1 µm to about 250 µm, more preferably from about 5 µm to about 25 µm and most preferably from about 5 µm to about 9 µm. While such thicknesses are preferred, it is to be understood that other thicknesses may be produced to satisfy a particular need and yet fall within the scope of the present invention. Such thermoplastic polymer layers may be bonded to the composite surfaces using well known techniques, such as thermal lamination, before, during or after merging together the individual fiber plies or fibrous material layers. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic polymer layers may also optionally be bonded to the composite surfaces with hot glue or hot melt fibers as would be understood by one skilled in the art. Additionally, as an alternative to a polymeric film, one or more surfaces of a fibrous material layer may be coated with protective coating, such as a coating providing water repellent properties. Suitable coatings non-exclusively include natural rubber, polyvinyl chloride, polyurethane, silicone elastomers, fluoropolymers, and waxes, as would be determined by one skilled in the art. Particularly preferred water resistant polymer coatings non-exclusively include fluoropolymer based coatings, such as OLEOPHOBOL™ water repellent agents commercially available from Huntsman LLC of Salt Lake City, Utah, and polyurethane coatings.

Figure 2:
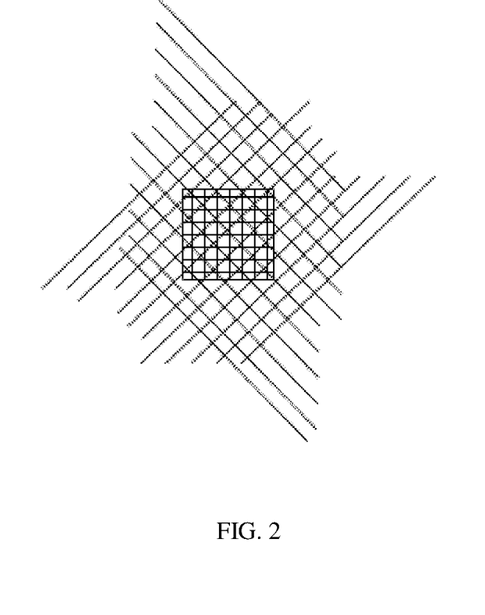
FIG. 2 is a perspective view schematic representation of a first fibrous material layer positioned on a second fibrous material layer, each fibrous material layer being formed with orthogonal fibers and with the fibers of one layer being positioned at −45°/+45° relative to the fibers of the other layer.

When forming the composites of the disclosure into a vest or vest cover article, the first surface of the first fibrous material layer is positioned as the outside facing surface against which modular attachments will be positioned. In this regard, it has been unexpectedly discovered that when merging the first fibrous material layer with the second fibrous material layer, the dimensional stability of the consolidated combination of the two layers is significantly improved when the fibers of the first fibrous material layer are oriented at +45° and −45° to the fibers of the second fibrous material layer. This may be accomplished by cutting sections on a bias from a larger 0°/90° fabric, or by physically orienting a 0°/90° fabric at +45°/−45° angles relative to the other fabric when positioning the layers together prior to consolidation. A schematic example of this preferred fiber orientation is illustrated in FIG. 2 (not drawn to scale). This fiber layer configuration is particularly desirable when the composites of the disclosure are employed in the fabrication of ballistic resistant vests or vest covers having a webless construction as discussed above. By combining the low tenacity first fabric with a high tenacity second fabric, and orienting the layers so that the fibers of the high tenacity second fibrous material layer are at +45°/−45° angles relative to 0°/90° fibers of the first fibrous material layer, the durability of the slots (see FIG. 1) is improved and the tendency of the fabric at the lower periphery of the slots to stretch and sag is substantially reduced.

In the most preferred embodiments of the disclosure, a vest cover article is formed from a composite that comprises, consists essentially of or consists of a first woven nylon fibrous material layer that is directly or indirectly bonded to a second fibrous material layer that comprises a non-woven fabric formed from a plurality of unidirectional plies of polyethylene fibers or aramid fibers, which second fibrous material layer is bonded to a third fibrous material layer that comprises a single ply of woven fabric or a plurality of unidirectional plies of polyethylene fibers or aramid fibers, and further including a polymer film adhered to the outermost surface of the third fibrous material layer. In this regard, the polymer film on the outermost surface of the third fibrous material layer constitutes the innermost layer of the vest cover article.

In order to further improve the durability of the composites of the disclosure, without forming an article having excessive weight, it is also preferred that the each fibrous material section of the disclosure has an areal density of about 400 g/m$^2$ or less, more preferably about 300 g/m$^2$ or less, still more preferably about 200 g/m$^2$ or less, still more preferably about 150 g/m$^2$ or less, still more preferably about 125 g/m$^2$ or less, still more preferably about 115 g/m$^2$ or less, still more preferably about 110 g/m$^2$ or less, still more preferably about 105 g/m$^2$ or less, still more preferably about 100 g/m² or less, and most preferably about 95 g/m² or less, with most preferred areal density ranges of from about 15 g/m² to about 95 g/m² or from about 30 g/m² to about 95 g/m². In a particularly preferred embodiment, the first fibrous material layer has an areal density of from about 200 g/m² to about 400 g/m² and the second fibrous material layer has an areal density of from about 15 g/m² to about 110 g/m², more preferably from about 30 g/m² to about 110 g/m². In preferred embodiments, the sum of the first fibrous material, second fibrous material, optional third fibrous material, and any additional optional layers or materials, produces a composite material having a total combined areal density of from about 60 g/m² to about 800 g/m, more preferably from about 100 g/m² to about 600 g/m², and most preferably from about 200 g/m² to about 500 g/m².

In this regard, it is most preferred that the first fibrous material layer has an areal density of greater than 50% of the total combined areal density of the entire composite article, particularly in a composite including only two fibrous material layers. In one embodiment, the areal density of the first fibrous material layer is greater than about 60% of the total combined areal density of all combined layers. In another embodiment, the areal density of the first fibrous material layer is greater than about 70% of the total combined areal density of all combined layers. In most preferred embodiments, the first fibrous material layer comprises from about 60% to about 75% of the total combined areal density of all the composite article layers combined and the second fibrous material layer comprises from about 20% to about 30% of the total combined areal density of all the composite article sections, and the optional third fibrous material layer when present preferably comprises from about 5% to about 10% of the total combined areal density of all the composite article layers.

In view of the above, a material layer having greater areal density is not necessarily thicker than a material layer having lower areal density. In this regard, the thickness depends to a degree on the pressure applied when consolidating/molding the fibrous plies together and the degree to which fibers overlap in individual fiber plies. The thickness of each fibrous material section will generally correspond to the thickness of the individual fibers and the number of fiber plies/layers incorporated into the composite. A preferred woven fabric, knitted fabric or felted non-woven fabric will have a preferred thickness of from about 25 μm to about 600 μm per ply/layer, more preferably from about 50 μm to about 385 μm and most preferably from about 75 μm to about 255 μm per ply/layer. A preferred two-ply unidirectional non-woven fabric composite will have a preferred thickness of from about 12 μm to about 600 μm, more preferably from about 50 μm to about 385 μm and most preferably from about 75 μm to about 255 μm.

The following examples serve to illustrate preferred embodiments of the disclosure:

Example 1

A composite is formed by consolidating together:
1) a one-ply layer of a woven CORDURA® nylon fabric woven in a plain weave style with perpendicular warp and weft (fill) fibers (having a denier of either 500 or 1000), and having a pick count of 35 warp fibers by 28 weft fibers; and
2) A pre-consolidated two-ply non-woven fabric layer fabricated from two cross-plied, non-woven polyethylene fiber plies in a 0°/90° configuration with the fibers in adjacent plies being longitudinally oriented at 90° (or at approximately 900) to each other and consolidated into a monolithic layer.

Each ply of the non-woven fabric is individually formed from an array of unidirectionally oriented, parallel SPECTRA® ultra-high molecular weight polyethylene fibers coated with a polyurethane binder. The tenacity of the polyethylene fibers is 37 g/denier and the resin content in each fiber ply is ca. 16%, and the non-woven fabric layer has an areal density of less than 100 g/m².

The woven nylon fabric and the non-woven polyethylene fabric layer are stacked on top of each other coextensively with the woven nylon fabric being positioned on top of the non-woven polyethylene fabric so that the longitudinal orientation of the fibers in all the fiber plies are oriented at +45°/−45° to each other. A 4-mil thick thermoplastic polyurethane adhesive film is placed between the two fabrics and then the woven nylon and non-woven polyethylene are merged together into a monolithic composite article by molding in a platen press at 2777 psi (19.15 MPa) for 15 minutes at 280° F. (137.77° C.), or by consolidation at milder conditions, e.g., at a temperature of from about 220° F. (104.4° C.) to about 250° F. (121.1° C.) and a pressure of approximately 100 psi (689.5 kPa).

After pressing, the monolithic composite article is then cooled to below 100° F. (37.8° C.) and removed from the press, and the two fibrous material layers are bonded together such that the polyurethane adhesive penetrates into the woven nylon fabric without fully permeating it. The composite article is then fabricated into a vest cover optionally having one or more arrays of slots as shown in FIG. 1.

Example 2

Example 1 is repeated except the composite article further comprises a third fibrous material layer attached to the pre-consolidated two-ply non-woven fabric layer, said third fibrous material layer comprising a one-ply layer of woven SPECTRA® ultra-high molecular weight polyethylene fibers. Examples of such woven SPECTRA® fabrics are those designated as SPECTRA® fabric styles 902, 903, 904, 912, 952, 955 and 960 available from JPS Composite Materials of Anderson, S.C. or other commercial weavers, fabricated with SPECTRA® fibers from Honeywell International Inc. An intermediate adhesive is applied between the non-woven SPECTRA® fabric and the woven SPECTRA® fabric and the layers are merged as specified in Example 1.

Example 3

Example 2 is repeated except the composite article further comprises a film of a linear low density polyethylene (LLDPE) that is laminated to the outer surface of the third fibrous material layer. The LLDPE film has a thickness of approximately 9 μm and an areal density of approximately 8 g/m², thereby forming a multilayer composite article having the following construction:
Woven Nylon Fabric (0°/90° perpendicular fibers)/+45° unidirectional non-woven UHMW PE ply/−45° unidirectional non-woven UHMW PE ply/woven PE fabric (0°/90° perpendicular fibers)/LLDPE film.

This consolidated composite construction has a slit tear resistance of greater than about 300 lbs as determined by the MIL-C-21189 slit tear testing method and a peel strength between the woven nylon fabric layer and the non-woven polyethylene fabric of at least 2 lbs/inch.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A vest or vest cover formed from a consolidated composite consisting essentially of:
    a) a one-ply layer of a woven nylon fabric, said woven nylon fabric comprising fibers, wherein said fibers consist of warp nylon fibers having a tenacity of less than 10 g/denier and weft nylon fibers having a tenacity of less than 10 g/denier, said woven nylon fabric having a weave density of from about 25 warp fiber ends per inch to about 60 warp fiber ends per inch and from about 25 weft fiber ends per inch to about 60 weft fiber ends per inch; and
    b) a two-ply non-woven fabric layer comprising two non-woven fiber plies, said non-woven fiber plies each comprising a plurality of unidirectionally oriented polyethylene fibers and each having an areal density of less than 100 g/m²;
    wherein the woven nylon fabric and the non-woven fabric layer are bonded together.

2. A vest or vest cover formed from a composite that consists essentially of:
    a first fibrous material layer comprising one fibrous ply, said first fibrous material layer comprising fibers having a tenacity of less than 10 g/denier and wherein said fibers of said one fibrous ply are optionally embedded in a polymeric binder; and
    a second fibrous material layer bonded to the first fibrous material layer, said second fibrous material layer comprising one or more fibrous plies, each of said one or more fibrous plies having an areal density of less than 100 g/m², said second fibrous material comprising a plurality of multifilament fibers having a tenacity of greater than 10 g/denier and wherein said fibers of each ply are optionally embedded in a polymeric binder;
    wherein said polymeric binder is present in one or both of said fibrous material layers; and
    wherein the first fibrous material layer and the second fibrous material layer are directly bonded together with the present polymeric binder in either or both of said fibrous material layers as an adhesive.

3. A vest or vest cover formed from a composite that consists essentially of:
    a first fibrous material layer comprising one fibrous ply, said first fibrous material layer comprising fibers having a tenacity of less than 10 g/denier and wherein said fibers of said one fibrous ply are optionally embedded in a polymeric binder; and
    a second fibrous material layer bonded to the first fibrous material layer, said second fibrous material layer comprising one or more fibrous plies, each of said one or more fibrous plies having an areal density of less than 100 g/m², said second fibrous material comprising a plurality of multifilament fibers having a tenacity of greater than 10 g/denier and wherein said fibers of each ply are optionally embedded in a polymeric binder;
    wherein the first fibrous material layer and the second fibrous material layer are bonded together with an intermediate adhesive.

* * * * *